H. E. LINDBLADH.
RULING MACHINE.
APPLICATION FILED AUG. 24, 1914.

1,242,823.

Patented Oct. 9, 1917.
7 SHEETS—SHEET 4.

Witnesses:
John B. Hynes
James E. Lynch

Inventor:
Harmon E. Lindbladh,
by Sylvanus H. Colby
Attorney.

H. E. LINDBLADH.
RULING MACHINE.
APPLICATION FILED AUG. 24, 1914.

1,242,823.

Patented Oct. 9, 1917.
7 SHEETS—SHEET 6.

Witnesses.
John R. Hynes
James E. Lynch.

Inventor:
Harmon E. Lindbladh,
by Sylvanus H. Cobb.
Attorney.

UNITED STATES PATENT OFFICE.

HARMON E. LINDBLADH, OF BROOKLINE, MASSACHUSETTS.

RULING-MACHINE.

1,242,823.　　　　　Specification of Letters Patent.　　Patented Oct. 9, 1917.

Application filed August 24, 1914. Serial No. 858,316.

*To all whom it may concern:*

Be it known that I, HARMON E. LINDBLADH, a citizen of the United States, residing at Brookline, in the county of Suffolk and State of Massachusetts, have invented a new and useful Ruling-Machine, of which the following is a specification.

This invention has to do with machines for ruling lines upon stationery, and is particularly directed to apparatus in which a plurality of ruling devices may be independently or simultaneously operated.

Its objects are to improve the arrangement and manner of control of the ruling devices and to generally increase the efficiency of the apparatus, as will appear in the following description and as will be pointed out in the appended claims.

In the accompanying drawings, Fig. 23 illustrates somewhat diagrammatically the manner in which power is applied to the entire machine.

Similar reference characters designate like parts in all figures of the drawings. The various sections are taken in the direction of the arrows associated with the section-lines.

Figures 24, 25:
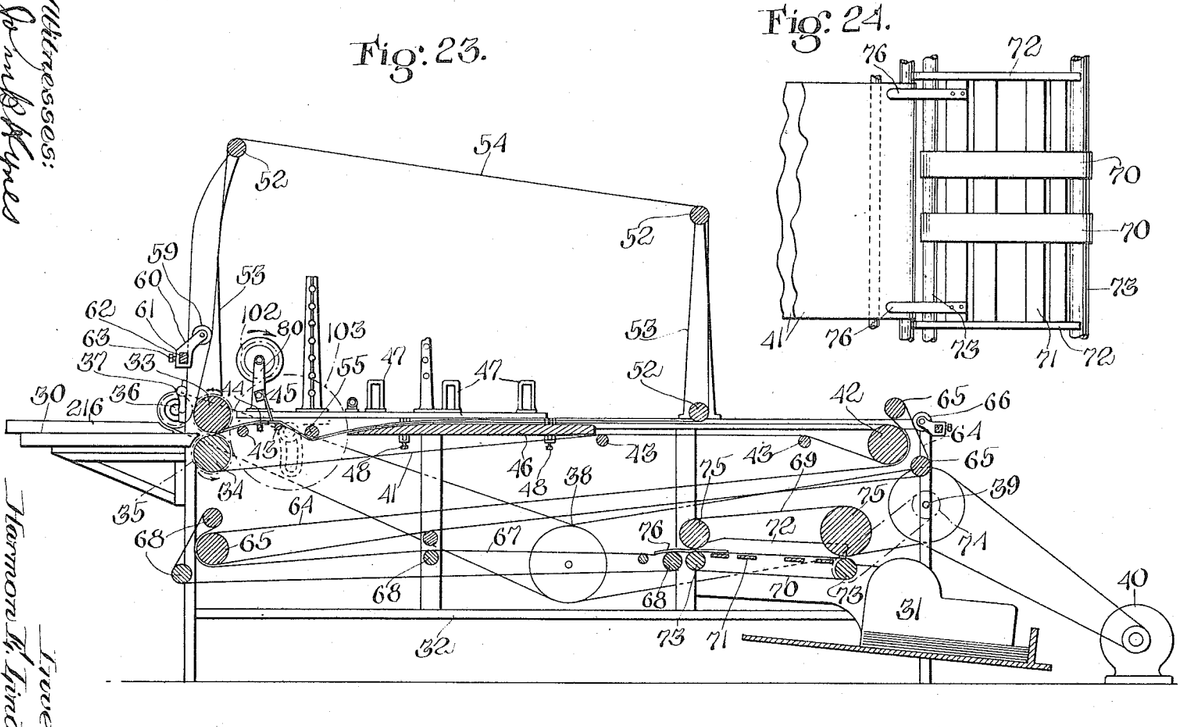
Fig. 24 shows in top plan view a portion of the lay-boy.
Fig. 25 is a broken detail in side elevation looking from the left in Fig. 23, illustrating the means for guiding the cords.
Figure 25:
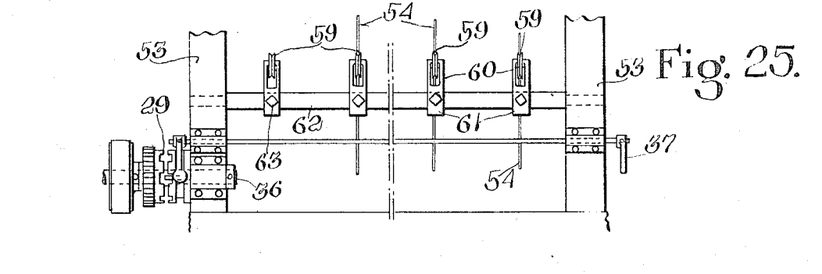

Referring to Fig. 23, there will first be briefly described the means for carrying the paper or other stock to be ruled through the machine from the feed-table 30 to the box 31 which receives the ruled sheets. This table and receiving box are supported near opposite extremities of a suitable frame 32, and respectively at the upper and lower portions thereof. The material operated upon is delivered by an attendant or by automatic feeding apparatus over the table 30 to a pair of upper and lower rolls 33, 34 journaled in the frame and oppositely rotated in the direction of the arrows by spur or other gears 35, indicated by dotted lines and fixed to the spindles of the rolls and to a counter-shaft 36. This counter-shaft may be driven through a clutch 29 (Fig. 25), controlled from the operator's side of the machine by a transverse handled rod 37, by any convenient arrangement of pulleys and belting 38 from a second counter-shaft 39, which receives power from a motor 40.

Over the roll 34 passes a cloth or feed-belt 41 extending about a roll 42 journaled in the frame at the delivery-end of the machine, and being at intermediate points maintained under proper tension by idler-rolls 43. The upper run of the belt travels over a bar 44, located just beyond the rolls 33, 34 and beneath a gate 45, said gate serving to position the sheets upon the feed-belt and to deliver them at the correct intervals for advance to the ruling devices. Beyond the bar and gate the feed-belt rests upon an extended segment-board or table 46, above which are the ruling devices generally indicated in Fig. 23 at 47, the standards only being shown. Both the gate and ruling devices will later be more particularly described. The table 46 serves as a positive support for the work when it is acted upon by the ruling devices, and its upward pressure against the belt may be varied by screws 48 (Figs. 6 and 7) threaded through brackets 49 attached to the inner sides of the frame and each receiving in a groove or way 50 projections 51 from the table. These brackets are mounted in pairs at the opposite sides of the table.

About the roll 33 and idlers 52 journaled in standards 53, 53 rising from the frame travel a series of cords or strings 54. The horizontal run of these cords follows the surface of the feed-belt 41 and maintains the sheets in position thereon while they are being acted upon by the gate and ruling devices. To provide for the proper positioning of the cords 54 transversely of the belt so that they shall run clear of the ruled lines, the common practice heretofore has been to groove one of the rolls, as 33, these grooves being closely adjacent to one another over the entire width of the belt. This is a comparatively expensive form of construction, and the sharp points between the adjacent grooves are liable to become injured in the use of the machine, causing the cords to be displaced and smear the ruled lines. I prefer to make the roll 33 smooth and guide the cords by narrow rotatable rolls 59 (Fig. 25), individual to said cords and mounted upon brackets 60 carried by loops 61 surrounding a bar 62 secured just to the rear of the roll 33, conveniently upon the standards 53. To prevent the brackets from swinging about the bar, said bar may be square in section and the loops correspondingly formed. The rolls are held at the desired points by set-screws 63 threaded through the loops and engaging the bar. To enable the proper tension of the cords upon the belt to be maintained, a member preferably in the form of a roll 55 lies across the cords and belt between the gate and table 46, the spindles of this roll being journaled in bearings 56 (Fig. 6) movable in ways in brackets 57 depending from the frame. These bearings are movable by means of screws 58 turning in the bottom of the brackets and threaded through the bearings. Not only may the tension of the belt and cords be regulated by the movement of this roll through its screws, but the position of the sheets upon the belt may be changed by putting more tension upon one side than the other, thus giving different frictional engagement at the edges of the sheets.

Bearing against the forward extremity of the belt 41 and partially encircling the roll 42 is a second set of cords 64, leading over idler-rolls 65 to the rear or feed-end of the machine. These cords are driven by the friction of the belt and are guided by individual grooved rolls 66 similar to the rolls 59 previously described. The cords 64 receive the ruled sheets and convey them face down, without contact with the lines on account of the spacing of the cords by the rolls 66, to a belt 67 operating over idler-rolls 68. The upper run of this belt is caused to travel toward the delivery-end of the machine by contact with the cords 64, and conveys the work, now face up, to the lay-boy, of which the receiving box 31 is a part. Between the belt 67 and the receiving box are upper and lower pairs of narrow belts or tapes 69 and 70, respectively. The lower pair move over a slatted floor 71 between suitable guide-boards 72, they running upon rolls 73, 73, one pair of which is driven by sprocket or other gearing 74 from the shaft 39, so that it is continuously operated from the motor 40 regardless of the condition of the clutch on shaft 36. The upper tapes travel over idlers 75, and with the tapes 70 positively engage and advance the finished work to the receiving box. In their travel through the machine over the cords and belts the sheets are liable to receive a strong static charge of electricity, which tends to cause them to adhere to the belt 67 as it passes over the forward roll 68, thus diverting them from the lay-boy and throwing them to the floor. To prevent this a pair of fingers 76, 76 (Fig. 24) is secured to the frame of the lay-boy at each side thereof and have their rearward ends downwardly curved to engage the belt 67. These fingers pass beneath the sheets as they approach the lay-boy, raising them from the belt and directing them between the tapes 69 and 70.

After the sheets to be ruled have been carried forward from the feed-table 30, where they rest with one edge in contact with a gage 216, between the feed-rolls 33, 34 by the belt 41 and cords 54, they coöperate with the gate 45 (Figs. 2, 4, 6 and 23) which positions said sheets upon the belt and automatically releases them for presentation to the ruling devices. This gate consists of the usual rod or shaft extending transversely of the belt 41 and having teeth 77 normally contacting therewith. At each end the gate-shaft is journaled, preferably in the upper portion of a plate or support 78 in the lower part of which is a slot 79. Through this slot and an opening near the foot of a standard 80 rising from the frame 32 passes a bolt 81, having a lever 82 projecting from its nut by which the latter may be turned to clamp the plate in position, a sleeve 83 being interposed between the standard and nut to bring the lever outside the frame. The movement of the plates 78, permitted by the slots and bolts, as the plates slide or rock upon said bolts, provides for a wide range of movement of the gate at each side of the machine, enabling it to be adjusted both toward and from the belt and longitudinally of the machine for properly coöperating with sheets the adjacent edges of which are at other than a right angle. Fixed to the gate-shaft at the operator's side of the machine is an arm 84 (Fig. 4) from which projects a pin contacting with a cam or driving member 85 carried by a shaft 86 journaled in the standards 80. The shaft is rotated in the direction of the arrow by a pinion 102 (Fig. 23) meshing with an adjustable change-gear 103, which in turn is rotated by the pinion 35 carried by the spindle of roll 34. This change-gearing allows the cam-shaft 86 to be operated at various speeds with relation to the mechanism which effects the travel of the sheets. The cam 85 is provided with means for altering its contact surface, it being preferably in two sections, one of which is fixed to the shaft and the other, 87, movable thereon, and having a segmental slot 88 through which passes a bolt 89 projecting from the companion section. By shifting these two sections over one another and securing them by the bolt the time of operation of the gate may be altered.

Figure 1:
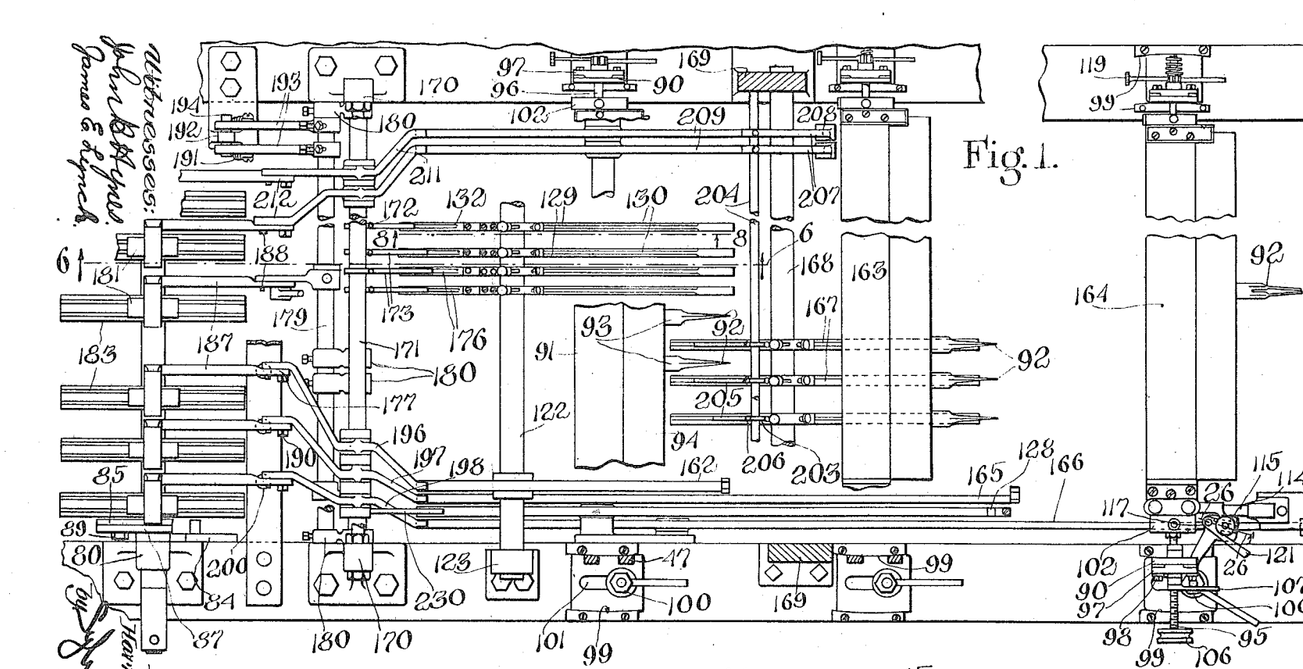
Figure 1 is a top plan view of one embodiment of the invention, portions being broken away and omitted.
Figure 2:
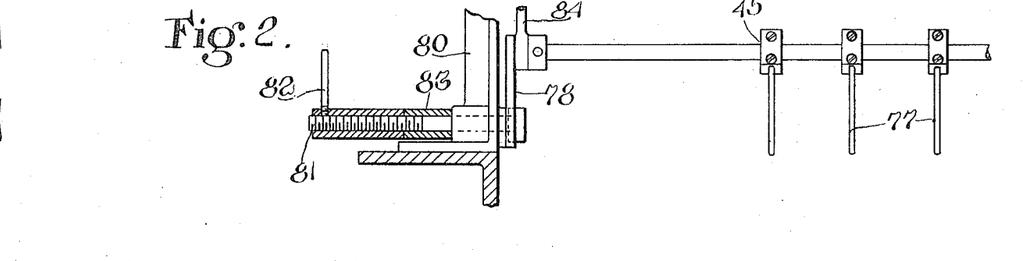
Fig. 2 is a detail in front elevation of the gate, with parts in section.
Figure 3:
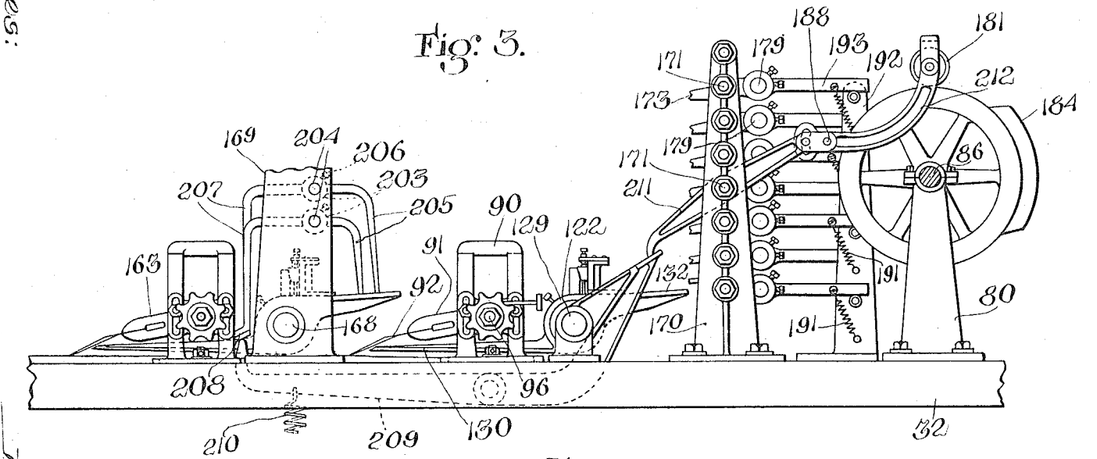
Fig. 3 is a broken elevation of the farther side of the machine, as it appears in Fig. 1.
Figures 6, 7:
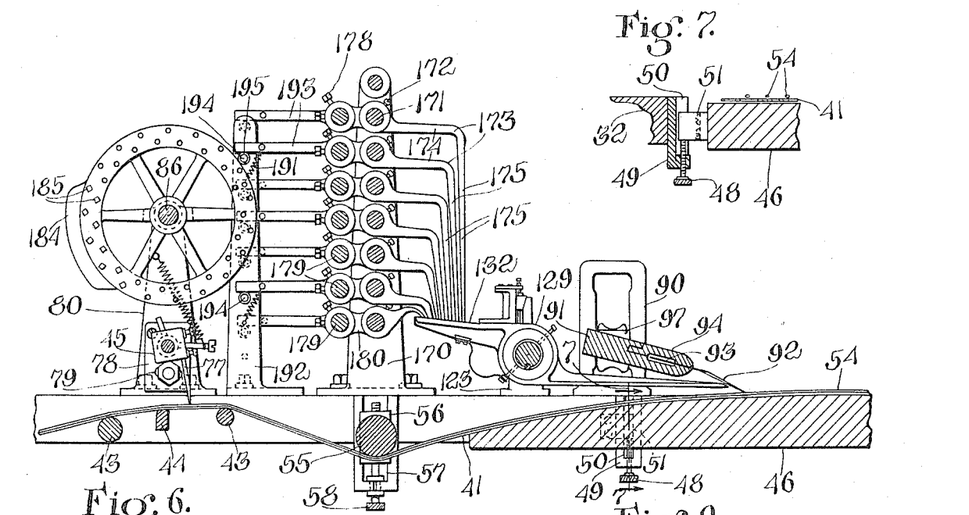
Fig. 6 is a vertical section on the line 6—6 of Fig. 1.
Fig. 7 is a transverse sectional detail on the line 7—7 of Fig. 6.
Figures 8, 9, 10:
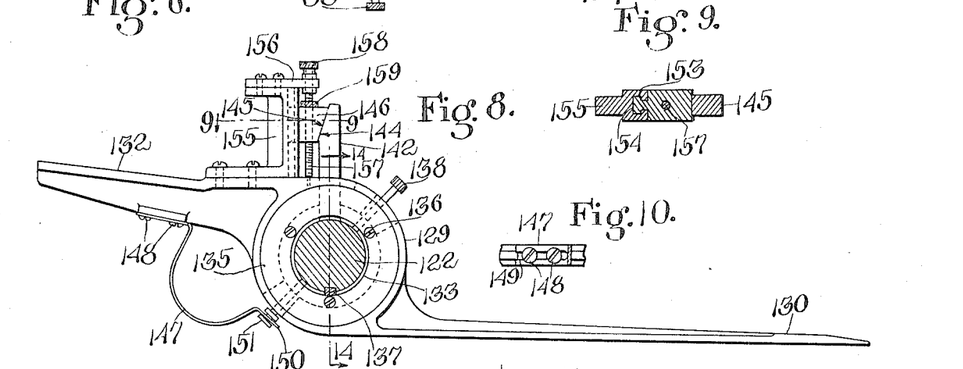
Fig. 8 is an enlarged longitudinal section on the line 8—8 of Fig. 1, showing one of the lifting levers.
Fig. 9 is a horizontal section on the line 9—9 of Fig. 8.
Fig. 10 is a detail looking from the underside of the lifting lever in Fig. 8, and particularly illustrating the manner of attaching the spring thereto.
Figure 11:
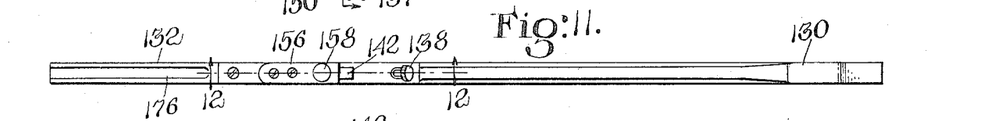
Fig. 11 is a top plan view of the lifting lever.
Figures 12, 13:
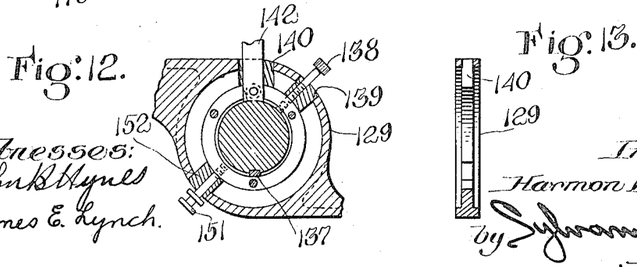
Fig. 12 is a vertical section on the line 12—12 of Fig. 11.
Fig. 13 is a transverse section through one of the lifting levers on the line 14—14 of Fig. 8.
Figures 14, 15, 16, 17, 18:
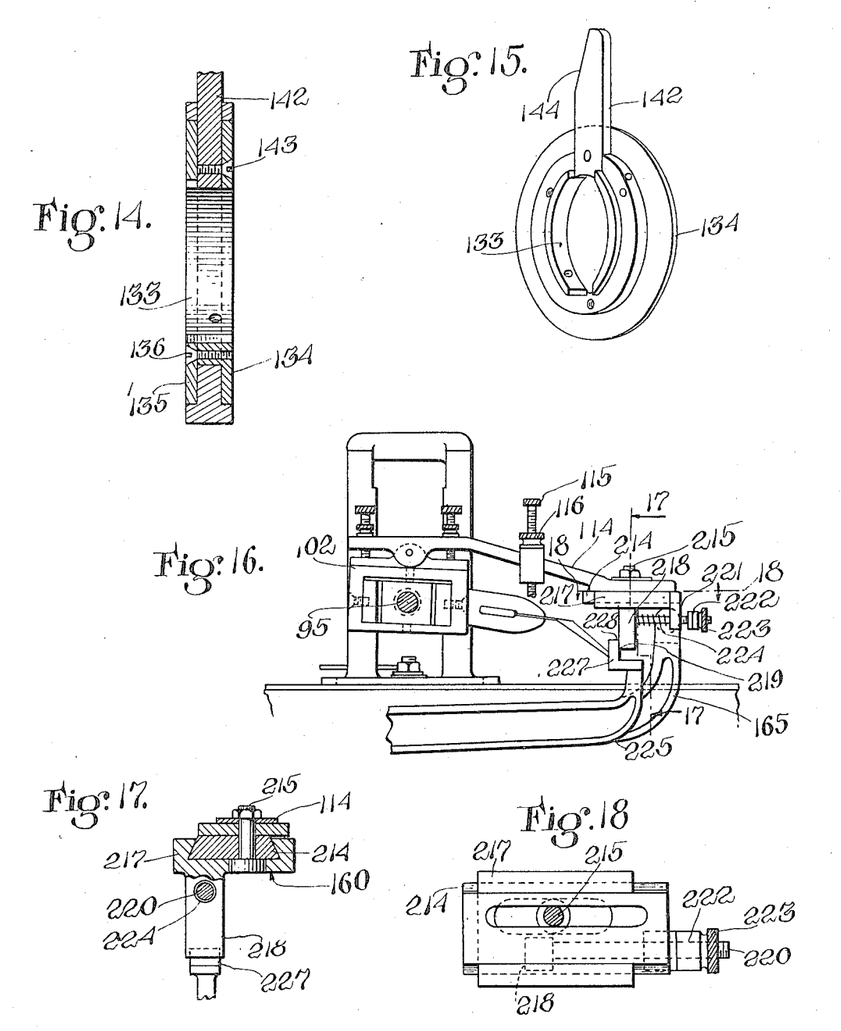
Fig. 14 is an enlarged section on the line 14—14 of Fig. 8.
Fig. 15 shows in perspective one side of the supporting collar.
Fig. 16 is a detail in side elevation of the rapid underlift or tripping mechanism applied to the second beam.
Fig. 17 is a transverse section on the line 17—17 of Fig. 16.
Fig. 18 is a horizontal section on the line 18—18 of Fig. 16.
Figure 19:
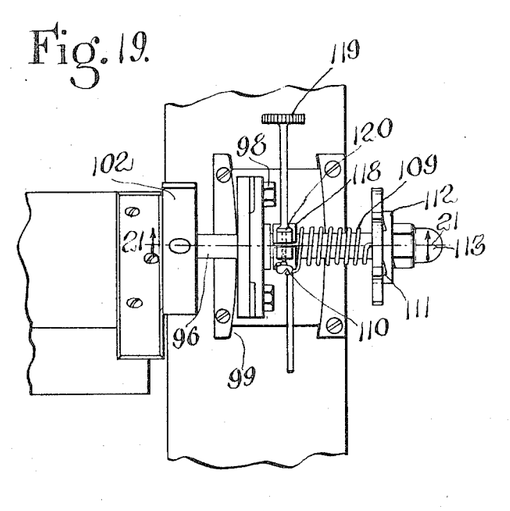
Fig. 19 is a top plan view of the tension and friction-adjusting means associated with the spindle at one end of each pen-beam.

In advance of the gate at opposite sides of the frame are standards 90, 90 (Figs. 1, 4 and 6) in which a transverse bar or beam 91 is supported near the rear of the table 46. In Fig. 1 portions of beam 91 are broken away to permit other elements to be seen, and here reference may be had to the corresponding parts of the companion beam 164. Upon this bar 91 are mounted pens or ruling devices 92 of any suitable construction, they being in the present instance of sheet metal, each having a shank 93 which is grasped by a clamp 94 secured to the beam (Fig. 6). The points of this series of pens coöperate with the belt 41 over the table. They are supplied with ink of the desired color by any convenient device (not illustrated). At the opposite ends of the pen-carrier-beam are spindles 95 and 96 carried by frames 97, 97 supported upon the standards 90. To enable the pen-beam to be adjusted vertically with respect to the work passing beneath it upon the belt, the frames are slotted and through these slots and through openings in the standards project bolts 98. The bolts when tightened serve to fix the frames in the desired position upon the standards. To enable the angle of the beam with relation to the belt 41 and work to be varied, the standards 90 move in ways 99 and are secured to the frame by bolts 100 passing through slots 101 in the feet of the standards. That the vertical and horizontal adjustments just described may be performed, the spindles 95 and 96 are connected to the beam by double or universal pivotal joints 102, 102 as is common in ruling machines. To permit horizontal adjustment of the beam laterally of the machine, the spindle 95 is threaded through its frame 97 and has a hand-wheel 106 by which it may be turned. To lock the threaded spindle in position a handled nut 107 operating upon the spindle may be forced into contact with the frame.

Figure 20:
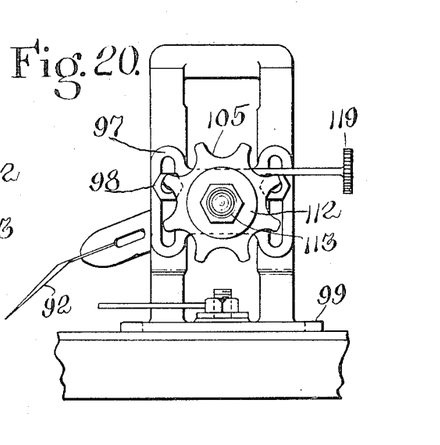
Fig. 20 is a side elevation looking from the right in Fig. 19.
Figure 21:
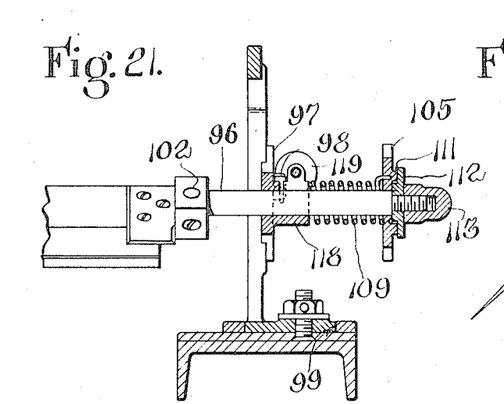
Fig. 21 is a vertical section on the line 21—21 of Fig. 19.
Figure 22:
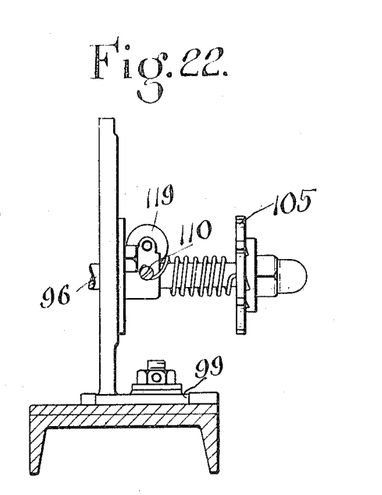
Fig. 22 is a partial side elevation looking from the left in Fig. 20.
Figure 26:
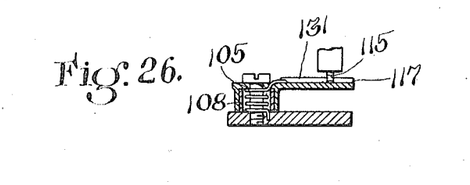
Fig. 26 is an enlarged sectional detail of the beam-latch on the line 26—26 of Fig. 1.

The opposite spindle 96 (Figs. 19 to 22) slides longitudinally in its bearing in the frame 97 in the transverse adjustment of the beam, and has associated with it means for obtaining the proper pressure of the pens against the work. As illustrated, this comprises a spiral spring 109 surrounding the spindle and having its inner end secured at 110 to the frame 97. The opposite extremity is fastened to a hand-wheel 105, rotatable about the spindle and provided at its outer face with teeth 111 adapted to engage corresponding depressions on a nut 112, threaded upon the end of the spindle and held against a shoulder thereon by a cap-nut 113. The relation of the engaging teeth on the hand-wheel and nut 112 is such that the former is held from turning on the spindle under the tension of the spring. Therefore to increase said tension it is only necessary to push the hand-wheel inward so that it is out of engagement with the nut and then turn it clockwise, as seen in Fig. 20. Upon restoring the hand-wheel to engagement with the nut the expansive force of the spring causes the points of the pens to bear with greater pressure against the work. By turning the hand-wheel in the opposite direction the spring-tension can, of course, be decreased. The beam may be turned with its spindles against the spring 109 to lift the pens from the belt by an arm 114 (Figs. 1 and 4) projecting forwardly from the beam at the operator's side of the machine, until a screw 115 threaded through a boss thereon and provided with a lock-nut 116 is above a latch 117 (Fig. 26) pivoted upon a bracket projecting from the frame 97 of the spindle 95. This latch is held normally to one side of the path of the screw 115 by a spring 105, surrounding the pivot and situated within a sleeve 108 on which the latch turns. A tail 121 of the latch contacts with the frame 97 and limits the movement produced by the tension of the spring. To lock the beam in its raised position the latch is turned into the path of the end of the screw, and the beam is thereby held until it is again tilted upwardly by the operator, whereupon the latch is thrown back by its spring leaving the pens free to engage the work. A rib or projection 131 at the inner edge of the upper latch-face contacts with the side of the screw 115 to prevent accidental disengagement.

In the movement of the pen-beam, the means for accomplishing which is hereinafter more particularly described, it is found that the pens are liable to "stagger" or shift laterally to a slight extent producing wavy, irregular lines. To prevent this a friction device is applied to the beam to exert a constant resistance to its movement. This is associated with the spindle 96 (Figs. 19 to 22), and may consist of a divided collar or portion 118 of its bearing in the frame 97, the halves of said divided portion being drawn into greater or less frictional engagement with the spindle by a screw 119 turning freely in and having a shoulder 120 engaging one half of the bearing and being threaded to engage the other half. This screw is turned until the friction of the bearing is sufficient to steady the beam and its pens.

In this machine I furnish means for independently controlling the engagement with the work of each pen of the series of this beam 91 and for simultaneously moving the entire series as well. Extending across the machine at the rear of the beam 91 is a shaft or like support 122 (Figs. 1, 3, 4 and 6) fixed in standards 123, 123 carried by the frame 32. Upon this shaft, arranged in a single series, are fulcrumed lifting or controlling levers 129, each having a nearly horizontal arm 130 projecting beneath the beam 91 to a point near the forward extremities of the pens. The opposite arm of each lever has a substantially horizontal extremity 132 for contact with the actuating members to be later described. There may be carried upon the shaft 132 controlling levers for as many of the pens as will be at any time employed, those which it is not desired to actively use being moved to one side out of the path of the sheets traveling through the machine.

Since it is often necessary to operate closely adjacent pens, and as these pens are individually very narrow, the controlling levers must be thin, and consequently they themselves present little bearing surface to the shaft 122. Therefore, if they were supported directly upon the shaft, they would tend to rock laterally and become disengaged from the pen, and would be difficult to position. To overcome this difficulty, I preferably mount the levers upon carriers, each lever being held against lateral movement by such carrier. In the present instance the levers are illustrated as being upon collars 133 (Figs. 8 to 15) furnishing an enlargement of the shaft or support 122, the interiors of which collars fit the shaft to slide thereon, while upon the exteriors the levers oscillate. At one end of the collar is an integral flange 134 against which one side of its lever rests, and at the opposite end is a removable flange 135 contacting with the other side of the lever, this flange being secured in place by screws 136 engaging the collar. The outer sides of the levers are provided with annular recesses surrounding the openings through which the collar and shaft pass, these recesses being of such size as to receive the flanges 134 and 135, their outer surfaces being practically flush with the faces of the levers. To prevent the rotation of the collars 133 upon the shaft 122, the latter has a spline 137 entering grooves along the interior of the collars, which are freely movable across the machine. Each collar may be fixed in the desired position upon the shaft, to aline it with a particular pen, by a set-screw 138 threaded through the collar and projecting through a slot 139 in the lever. By this carrier arrangement I am able to place the controlling levers as closely to one another as though they were mounted directly upon the shaft, and yet provide them with positive support against lateral displacement.

Projecting upwardly from each collar 133 through a slot 140 in its lever is a stop arm 142, secured to the collar by a screw 143 and having at its rearward edge an inclined contact-face 144. Against this face strikes a corresponding face 145 of a contact-block or member 146 carried by the lever. When these faces are together, the forward extremity of the arm 130 of the lever is in its lowest position, in coöperation with its pen but permitting said pen to rest upon the belt 41 or work thereon. To normally maintain this relation a spring connects the lever and supporting shaft. This spring, as illustrated, consists of a bowed leaf 147 fixed at its forward extremity to the lever by screws 148 extending through a longitudinal slot 149 in the spring and being threaded into the lever. The opposite end of the spring is forked at 150 to engage a slot or groove in the head of a stud or projection 151 fixed to the collar 133 and movable in a slot 152 in the lever. The stud gives a fixed point against which the spring presses to raise the end 132 of the lever and correspondingly lower the pen-engaging portion. By fixing the end of the spring in different positions by means of its slot and the screws 148 the distance of this end from the stud 150, and therefore the tension of the spring, may be altered. To aline the controlling levers and properly position their forward ends with respect to the pens, the blocks 146 are made adjustable, so that the inclined faces 144 and 145 may contact over different areas and thus vary the vertical position of the forward end of the lever when they are together. For this purpose, the block is provided with a T-shaped or similar projection 153, moving in ways 154 formed in a post or standard 155 rising from the lever above the shaft 122. Rotatable in a cap-plate 156 projecting over the block from the top of the standard is a screw 157, threaded through the block and having a knurled head 158 by which it may be turned. A lock-nut 159 engages the top of the block to retain the screw against rotation, except when it is released by the operator. It will be clear that when the screw is turned to lower the block 146, the pressure of its face 145 against the corresponding face 144 of the stop-arm 142 will rotate the lever in an anti-clockwise direction, as viewed in Fig. 8, and will raise the pen-engaging end of the lever, while a reverse movement will lower said end.

Figures 4, 5:
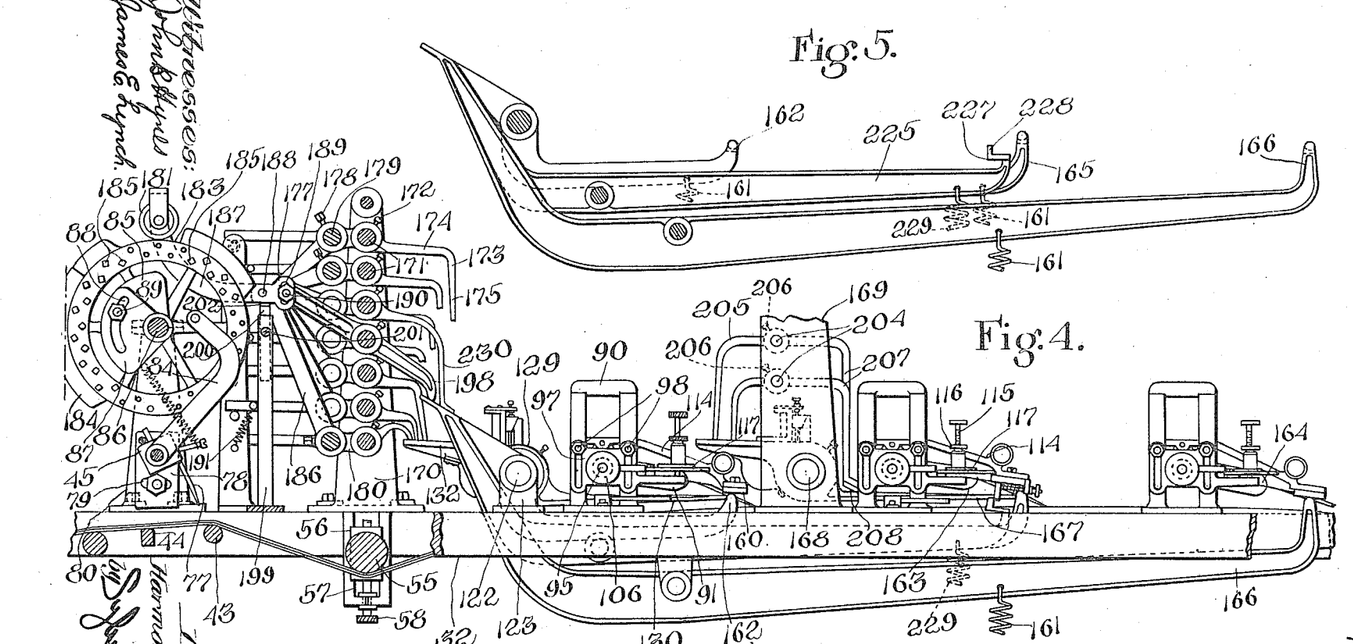
Fig. 4 is a similar view of the opposite side of the machine.
Fig. 5 illustrates in detail the levers upon the operator's side of the machine for actuating the entire series of pens carried by the plural beams.

In some work, instead of lifting the pens individually, it may be desired to operate them all simultaneously. In such case, it is convenient to rock the beam 91 as a whole upon the usual swivel connection in the spindle 95 and upon the spindle 96. To effect this movement, the arm 114 may have a contact-surface 160 which is engaged by a special controlling lever 162 turning freely upon one extremity of the shaft 122 (Figs. 1, 4 and 5). Since, on account of the service which it is to perform and its location, the lever 162 is of considerable width at its fulcrum point on the shaft 122, it is unnecessary to mount it upon a collar or carrier. Sometimes, and especially when a form is to be ruled in which several groups of lines begin and end at corresponding points or upon which certain lines are very closely placed, much labor is saved in setting the machine for its work by having a plurality of series of pens, there being shown two beams 163 and 164 in addition to that already described. Each of these beams 163 and 164 may be formed and mounted in precisely the same manner as the beam 91, and is situated above the table 46, the former being near its center and the latter adjacent to the forward end. The beams 163 and 164 are provided with controlling levers 165 and 166, respectively, fulcrumed at suitable points in the frame, and contacting with the beam-arms 114 to oscillate the beams and thus raise and lower each series of pens. The pen-beam 163 also has associated with its pens a set of controlling levers 167, which may be in all respects identical with the levers 129 for the pens of beam 91, and which are carried in the same manner on a shaft 168 mounted in standards 169, 169.

Journaled to oscillate in standards 170, 170, carried by the frame is a vertical series of transverse shafts or supports 171 (Figs. 1, 3, 4 and 6) upon each of which may be variably fixed by set-screws 172 a series of actuating arms 173. These arms on the various shafts are of different lengths, but those on the same shaft are preferably of the same length, having horizontal portions 174 and vertical portions 175, which are respectively parallel with one another upon succeeding shafts. All these vertical portions extend over the ends 132 of the controlling levers 129 and coöperate with grooves 176 lying along the upper sides of the ends of the levers, these grooves retaining the points of the arms against disengagement. The portions 175 of the levers for each shaft 171 occupy different planes with respect to the other groups and thus clear them, so that all the arms of the various groups may be freely adjusted across the machine without interference with the arms of the associated groups.

To impart to each shaft 171, and consequently to each of its groups of arms 173 and corresponding groups of levers and pens, the pen-controlling movement there is fixed to each shaft 171 a driving arm 177. This arm is secured by a set-screw 178 to a rod 179 forming one part of a rectangular fulcrum-frame, the other members of which consist of the parallel shaft 171 and a pair of arms 180, 180, secured outside the arms 173. Each driving arm 177 has at its outer or rear extremity an anti-friction roll 181 contacting with a cam-surface upon a wheel 183, the number of wheels corresponding to the number of different pen-movements, and being fast upon the shaft 86. The cam-surfaces may be furnished by plates 184, situated in peripheral grooves in the wheels 183 and secured by screws 185 engaging circumferential series of holes about the wheels. By altering the extent and location of the plates 184, the contact of each cam-surface may be varied to properly time the operation of its group of actuating arms, controlling levers and pens. To permit a further adjustment of the throw of the actuating arms, and therefore of the lift of the pens, each driving arm 177 is made in sections, there being a portion 186 converging with the associated arms from the rods 179 to a common axis situated just in advance of and below the upper edge of the cam-wheels, and a curved portion 187 which extends between the cams and upwardly to a point above them, where the anti-friction roll 181 is mounted and overhangs its cam. These two sections are articulated at 188, that last mentioned having a slotted sector 189 through which a bolt 190 passes and is secured to the portion 186. One marked utility of this adjustment is that if, after having correctly arranged the cams to give the desired time of lift and release to the pens, it is found that they do not properly discharge the ink for the particular grade of stock operated upon, the angular position of the portion 187 of the driving arm may be changed. This, without varying the point of application and removal of the pens with respect to the work, will alter the distance through which they move before they contact with the sheet, and therefore the force with which they strike, and thus cause the ink to be initially discharged with greater or less freedom. It will be seen that each fulcrum-frame with its actuating arms 173 and driving arm 177 furnishes a multiple-armed lever connecting a driving cam with one of the groups of controlling levers, and that the driving arm and actuating arms are each adjustable over the full width of the machine without interference with opposite arms of the same lever. The rolls 181 are drawn into coöperation with the cam-wheels by spiral springs 191, each secured at one extremity to standard 192 and at the opposite end to an arm 193 fixed to the rod 179. The arms 193 normally rest on stop-pins 194 projecting from the standard 192, thus limiting the movement of the rolls toward the cam-wheels. Sleeves 195 of rubber or other yieldable material preferably surround the pins 194 to cushion the arms and reduce the noise caused by their contact.

Mounted outside the arms 180 to turn directly upon two of the shafts 171, since it is unnecessary to adjust them laterally of the machine, are actuating levers 196, 197 and 198 for the controlling levers 162, 165 and 166 and their pen-beams (Figs. 1, 4 and 5). In the case of these levers the actuating and driving arms may be made integral. The latter arm, however, is preferably formed in adjustable sections similarly to the levers for actuating the individual pens. Stops for these levers are here shown as furnished by extensible posts, lower tubular sections 199 of which rise from a cross bar extending transversely of the frame and receive upper telescoping sections 200, which are adjustable vertically in the lower section by means of set-screws 201. With a cushion 202 at the top of the section 200 a driving arm of one of the actuating levers 196, 197 and 198 contacts, and is normally forced into contact therewith by springs 161 connecting the frame 32 and levers 162, 165 and 166 forward of their fulcra.

To actuate the levers 167 for individually controlling the pens of beam 163, levers 203 are fulcrumed in the standards 169 above the shaft 168. These levers, of which there are two illustrated to actuate two pen-groups, preferably comprise a shaft 204 turning in the standards and having actuating arms 205 corresponding to the arms 173 of the previously described actuating levers. These arms 205 are adjustable along their shafts to bring them into coöperation with any of the controlling levers 167 by means of set-screws 206 which are threaded through the levers and may be turned into engagement with the shafts. Projecting from the shafts 204 at the opposite side from the arms 205 are driving arms 207, one for each shaft, each arm having a contact-surface 208. Two intermediate or transmitting levers 209, are fulcrumed upon the frame at the opposite side from the levers 162, 165 and 166, and have their forward extremities drawn by springs 210 attached to the frame against the ends of main actuating levers 211, which are shown as mounted to turn about one of the shafts 171. Each of these levers 211 has a driving arm 212 adjustable in the same way as are the arms 177, each arm 212 being provided with a roll coöperating with a cam upon the shaft 86. It will be seen that the movement of the cams will be communicated through the levers 211 and 209 to the arms 207, and by them through the arms 205 to the lifting levers 167, which, in turn, individually control the pens of beam 163. While I have described the main actuating levers 211 as turning about shafts 171 of actuating levers for the pens of beam 91, it will be obvious that one of the last-named actuating levers might be appropriated for this purpose without departing from the spirit of the invention, the actuating arm thereof being merely moved into engagement with the end of a transmitting lever 209.

In connection with the second beam 163, I have shown means whereby the entire series of pens may be rapidly raised from and returned to the work, so that short breaks in the ruled lines are made impossible with the relatively slow underlift such as results from the operation of levers 162, 165 and 166. Carried by the arm 114 of beam 163 adjacent to the contact-surface 160 is a pen-controlling contact member (Figs. 4, 16, 17 and 18), the supporting plate 214 of which is secured to the underside of the arm by a bolt 215. This supporting member is beveled to engage a dove-tailed way in a slide 217, said slide having a downward projection 218, the rear of which is formed in a comparatively sharp angle 219. Fixed to the projection 218 is a screw 220 for altering the normal position of the slide and projection upon the beam-arm, this screw extending through an opening in a lug 221 depending from the forward end of the support. Outside the lug the screw 220 carries a contact-nut 222 and a lock-nut 223, the location of the former nut determining the normal position of the projection longitudinally of the machine. Surrounding the screw is a spiral spring 224, which acts by its expansion to force the projection rearwardly.

Between the pen-controlling projection 218 and a primary actuator or cam-wheel 183 is a connecting or tripping member, preferably in the form of a lever 225 fulcrumed upon the frame, and having a vertical projection 227 provided with an upper forward angular edge 228 normally lying beneath the end of the projection 218, the location of the edge 219 of the projection 218 being varied with respect to the corresponding edge 228 on the lever 225 by means of the nuts 222 and 223. The opposite arm of the lever 225 is drawn by a spring 229 connecting the lever and frame against an actuating lever 230 movable about one of the shafts 171, as are the levers 196, 197 and 198. This actuating lever is driven by one of the cam-wheels 183.

In using this tripping device the slide 217 is adjusted by the nut 223 until the projection 218 lies above the edge 228 of the lever 225, as appears in Fig. 4 of the drawings. As the cam-plate in its revolution strikes the lever 230, it lifts the forward end of the lever 225, and this moving in the arc of a circle almost vertically imparts to the arm 114, and therefore to the pens, an extremely rapid lift. As the rise of the lever 225 continues, the horizontal component of the circular movement carries it to the left, the projection 227 slipping under the face of the projection 218 until it reaches the edge 219. Then a slight further travel of the lever in the same direction frees the projection 218, the edges 219 and 228 abruptly snapping by one another (Fig. 16), tripping the pens so that they at once return to contact with the sheet. The pens are now entirely removed from the influence of the cam-plate and levers, and the lever 230 continues to be held by the spring 229 in contact with the cam-plate, and then as said cam-plate passes from beneath the lever the latter is stopped by an adjustable post 199, 200, such as has been previously described. The fall of the lever-projection 227 past the projection 218 under the tension of the spring 229 is permitted by the yield of the slide against the spring 224 without affecting the pens. When the cam-plate clears the lever 230 and the end of the lever-projection passes below the projection 218, the spring 224 returns the slide and its projection to their initial position. By altering the relation of the edges 219 and 228 by means of the nut 222 the period of pen-controlling engagement between the lever 225 and projection 218 may be made as brief as desired, yet maintaining an ample lift. That is, the time during which the horizontal component of the circumferential movement acts to carry the edge of the lever past the edge of the projection may be reduced to a minimum without materially changing the vertical component which causes the lifting action. In this way breaks of one eighth of an inch in the ruled line may readily be made.

It should further be observed that this device, in freeing the pens from the influence of the cam-wheel after the lift, renders the timing of the pen-movement substantially independent of the length of the sheets ruled. In a machine in which this movement depends upon the contour of the cam, the period during which the pens are lifted is in proportion to the length of the sheets, because in decreasing the speed of rotation of the gate-cam 85 by means of the change-gears to release the sheets at longer intervals, the time of action of the cam-plates 184 driven by the same shaft 86 as the cam 85 will be increased, and the pen-lift thus prolonged. As the longer the sheets the shorter must be the cam-action, because of this decrease of the speed of rotation of the cam-wheel, the difficulty in making short spaces is increased. With the present device, however, the length of time which the tripping member is under the influence of a cam is so insignificant that changes in the gear do not perceptibly affect the breaks in the lines.

To prepare this ruling machine for operation a controlling lever 129 or 167 is adjusted beneath each pen of beam 91 or 163 which is to be separately raised from the work. This is accomplished by sliding the collars 133 carrying the levers along the shafts 122 and 168, and then turning the set-screws 138 against the shafts to hold the levers alined with the pens. When all the pens of the beam 91 or 163 are to be lifted at the same time, the levers 162 and 165 are brought into action; and for the production of closely spaced lines or for other exigencies which the operator may encounter in particular cases, the beam 164 and its lever 166 are employed. Obviously any one of the beams may be used alone, or they may be combined in various ways as the character of the work may demand. For each group of lines beginning and terminating at the same point, other than the two groups corresponding to the movement of the pens of the beams as a whole, a cam-wheel 183, shaft 171, and driving-arm 177 are utilized, with the actuating arms 173 of each shaft corresponding in number to the lines in each group. The variable cam-plates are adjusted to move the pens through the lever systems at the correct times. When the breaks in the lines are too brief to be produced by means of the usual cam, the controlling or tripping lever 225 is applied to the device associated with the arm 114 of beam 163 and such lines ruled by the pens of this beam.

The machine having been set, sheets to be ruled are placed upon the delivery-shelf against the gage and successively advanced between the feed rolls 33, 34 and the belt 41 and cords 54. Upon reaching the gate 45, they contact with its teeth and are squared on the belt by them, and then released by the action of the gate-cam at the proper time for presentation to the pens. This time of release bears a definite relation to the period of operation of the pen and beam-controlling cams, so that the beginning of the ruled lines will be at the proper distance from the forward edge of the sheet. As the sheets advance over the table beneath the pens, those not lifted by the controlling levers produce their lines; and as the travel of the sheets continues the passing of the cam-surfaces 184 from beneath certain of the driving arms drop their pens, which also produce other lines. Thus the ruling of all the lines running in this direction across the sheet is completed at a single operation, this continuing for each sheet delivered by the gate, the different lengths of lines being automatically controlled throughout. From the pens the feed-belt 41 conveys the sheets to the cords 64 and belt 67, and during the travel therewith the ink on the sheets becomes dry. They are then received by the tapes of the lay-boy which finally delivers them to the receiving-box 31. When another form is to be ruled, it is a comparatively simple matter to vary the pens, the actuating and controlling levers and their operating cams to meet the new conditions.

While I have herein disclosed a single embodiment of my invention, it is to be understood that it is but one of many which might be employed and still be within the scope of the following claims:

I claim:

1. In a ruling machine, a ruling device, a controlling device for the ruling device movable into and out of coöperation therewith, a support which the controlling device surrounds and about which it moves, and means connecting the controlling device and support and acting to return said controlling device to its normal position.

2. In a ruling machine, a ruling device, an oscillatory controlling device for the ruling device, a support which the controlling device surrounds and about which it oscillates, the support and controlling device being of the same lateral extent and a spring connecting the support and controlling device and lying in the same vertical plane as said controlling device.

3. In a ruling machine, a ruling device, an oscillatory controlling device for the ruling device, a shaft about which the controlling device oscillates, said shaft being provided with a projection, a spring connecting the shaft projection and controlling device, and means for fixing the position of the spring upon the controlling device whereby its tension may be varied.

4. In a ruling machine, a ruling device, an oscillatory controlling device for the ruling device, a support which the controlling device surrounds and about which it oscillates, a spring connecting the support and controlling device, and means for securing the spring in different positions.

5. In a ruling machine, a ruling device, a delivery device for carrying the work to be ruled beneath the ruling device, a movable controlling device for the ruling device, a support which the controlling device surrounds and about which it moves, and a stop for the controlling device carried by the support.

6. In a ruling machine, a ruling device, an oscillatory controlling device for the ruling device, a shaft about which the controlling device oscillates, and a stop for the controlling device carried by the shaft, said stop and controlling device having contact faces variable in position with respect to one another.

7. The combination with a ruling device, of a controlling lever therefor, and a support having an enlargement upon which the controlling lever is fulcrumed, said enlargement being substantially included between the opposite sides of the lever.

8. The combination with a ruling device, of a controlling lever therefor, and a support having an enlargement provided with annular flanges contacting with opposite sides of the lever, the lever having recesses to receive the flanges.

9. The combination with a ruling device, of a controlling lever therefor provided with an opening and having opposite recesses surrounding said opening, of a support extending through the opening and having an enlargement of substantially the same thickness as the lever, said enlargement being provided with flanges lying within the recesses.

10. In a ruling machine, a ruling device, a controlling device therefor provided with an opening, and a support which the controlling device surrounds and about which it is movable into coöperation with the ruling device, said support having a lateral portion extending through the opening.

11. In a ruling machine, a ruling device, a controlling device therefor provided with an opening, a shaft about which the controlling device surrounds and about which it is movable having a portion extending through the opening, and a spring coöperating with said portion and with the controlling device and tending to separate the controlling and ruling devices.

12. In a ruling machine, a ruling device, a controlling device therefor provided with an opening, and a shaft about which the controlling device surrounds and about which it is movable having a portion extending through the opening, said portion and controlling device carrying coöperating contact faces movable toward and from each other in the control of the ruling device.

13. In a ruling machine, a ruling device, a controlling device therefor provided with an opening, a support about which the controlling device is movable having a portion extending through the opening, said portion and controlling device carrying coöperating contact faces, and means for moving one of the elements carrying the contact faces to vary the range of movement of the controlling device.

14. A ruling machine comprising a pen-controlling lever provided with an opening, a shaft, a lever-supporting collar carried by the shaft and having a slotted projection extending through the lever-opening, and a spring secured to the lever and having a fork engaging the projection-slot.

15. A ruling machine comprising a pen-controlling lever provided with an opening, a shaft, a collar carried by the shaft having an arm extending through the opening, and an adjustable member carried by the lever and contacting with the arm.

16. A ruling machine comprising a pen-controlling lever provided with an opening, a shaft, a collar carried by the shaft, and about which the lever is movable and a screw threaded through the collar, extending through the lever-opening and engaging the shaft.

17. The combination with a ruling device, of a controlling lever therefor, a support for the lever having an enlargement provided with annular flanges contacting with opposite sides of said lever, the lever having recesses to receive the flanges, and a projection extending from the support between the flanges and passing through and coöperating with the lever.

18. The combination with a ruling device, of a controlling lever therefor, a support having an enlargement provided with annular flanges contacting with opposite sides of the lever, the lever having recesses to receive the flanges, projections extending from the support between the flanges and passing through the lever, and members carried by the lever contacting with the projections.

19. A ruling machine comprising ruling devices, and controlling means for said devices including levers fulcrumed on different axes and having arms formed in two sections, one section of each arm extending from its fulcrum directly to a common axis and the other sections of the arms all extending in substantially the same direction, and driving devices with which the last-named arm-sections coöperate.

20. In a ruling machine, ruling devices, a series of rotatable cams arranged side by side, and controlling means for said devices including levers, said levers extending between the cams and having a portion extending over and coöperating with the cams.

21. In a ruling machine, ruling devices, a series of rotatable cams arranged side by side, and controlling means for said devices including levers, each lever having an arm formed in two pivoted sections, one of said sections extending between the cams and having a contact portion overhanging a cam.

22. The combination with ruling devices, of controlling means for said devices including levers having shafts extending across the machine, arms projecting from the levers at one side of the machine, and stops with which the arms coöperate.

23. The combination with ruling devices, of controlling means for said devices including levers having shafts extending across the machine, arms projecting from the levers at one side of the machine, stops with which the arms coöperate, and means for varying the times of contact between the arms and stops.

24. The combination with ruling devices, of controlling means for said devices including levers having shafts extending across the machine, arms projecting from the levers at one side of the machine, a post, and pins projecting from the post into the paths of the arms.

25. The combination with ruling devices, of controlling means for said devices including levers having shafts extending across the machine, arms projecting from the levers at one side of the machine, a post, pins projecting from the post into the paths of the arms, and springs connecting the post and arms.

26. In a ruling machine, ruling devices, controlling means for said devices including a lever and stop-post having an extensible section with which the lever contacts.

27. In a ruling machine, ruling devices, a movable carrier therefor, and means independent of one another for moving the carrier at different speeds.

28. In a ruling machine, the combination with a pen-beam, of a rapid underlift means and an independently operable relatively slow underlift means for said beam.

29. In a ruling machine, the combination with a beam, of pens mounted thereon, plural means independently operable for moving the beam at different speeds to lift all the pens, and means for individually lifting the pens.

30. The combination with a pen, of a plurality of cams, and lifting connections between the cams and pen, the lift of the pen being dependent upon the extent of one of the cams, said connections including means for causing the movement of the pen to be independent of another of the cams.

31. In a ruling machine, a pen-beam, a plurality of levers coöperating therewith, and a connection between one of the levers and the beam movable upon said beam under the influence of said lever.

32. In a ruling machine, a pen-beam, an arm projecting therefrom and having a contact surface, a lifting lever coöperating directly with the contact surface, a second lifting lever, and a movable member interposed between said second lever and the arm.

33. In a ruling machine, the combination with a ruling device, of a plurality of underlift means therefor adapted for successive operation at different speeds to vary the contact of the ruling devices with a single piece of work, and independently movable means for operating said underlift means.

34. In a ruling machine, the combination with a pen-beam, of cam mechanism, and rapid underlift means and relatively slow underlift means interposed between the cam mechanism and pen-beam.

35. In a ruling machine, the combination with a pen-beam, of cam mechanism, and rapid underlift means and relatively slow underlift means interposed between the cam mechanism and pen-beam, one of said underlift means operating independently of the contour of the cam-mechanism.

36. In a ruling machine, the combination with a beam, of pens mounted thereon, cam mechanism, plural means independently operable for moving the beam at different speeds to lift all the pens, and means for individually lifting the pens, all of said means being operable from the cam mechanism.

37. In a ruling machine, ruling devices, means for supporting the work while being ruled, means situated above and below the work and traveling over the supporting means to deliver the work to the ruling devices, means for controlling the delivery of the work, and variable tension means for the delivery means situated between the controlling means and supporting means.

38. The combination with ruling devices, of a table situated below the ruling devices, a delivery-belt and cords traveling over the table, means for controlling the delivery of work to the ruling devices, and variable tension means for the cords and belts situated between the controlling means and table.

39. The combination with ruling devices, of a table situated below the ruling devices, a belt and cords traveling over the table to deliver work to the ruling devices, and means situated in proximity to the feed-end of the table for pressing the cords upon the belt.

40. In a ruling machine, ruling devices, means for supporting the work while being ruled, means situated above and below the work traveling over the supporting means to deliver the work to the ruling devices, tension means for the delivery means extending across the machine, and means for movably mounting each end of the tension means.

41. The combination with ruling devices, of a table situated below the ruling devices, a delivery-belt and cords traveling over the table, means for controlling the delivery of the work to the ruling devices, a roll resting upon the cords and belt between the controlling means and table, and a vertically adjustable bearing for the roll.

42. The combination with ruling devices, of a table situated below the ruling devices, a delivery-belt and cords traveling over the table, means for controlling the delivery of work to the ruling devices, a roll resting upon the cords and belt between the controlling means and table, a bearing for each end of the roll, and means for adjusting the position of each bearing to vary the pressure of either extremity of the roll upon the cords and belt.

43. In a ruling machine, plural series of ruling devices, a separate support for each series and means for independently controlling with respect to one another the movement of individual ruling devices in each series.

44. In a ruling machine, plural series of ruling devices, a series of controlling devices for each series of ruling devices, and driving means common to the series of controlling devices and having connections thereto.

45. In a ruling machine, plural series of pens, a separate support for each series, a series of controlling levers for each series of pens, said controlling levers operating individual pens, and a single series of cams having connections by which all the series of levers are driven.

46. In a ruling machine, plural series of pens, a series of controlling levers for each series of pens, an actuating lever for each series of controlling levers, and a series of cams for driving all the actuating levers.

47. The combination with two pen-beams and pens mounted thereon, of lifting levers coöperating with the pens on each beam, two series of levers for actuating the lifting levers of both pen-beams in groups, a series of cams adjacent to one of the series of actuating levers, and more widely separated from the other series and levers interposed between the cams and the more distant series of actuating levers.

48. The combination with two pen-beams and pens mounted thereon, of lifting levers coöperating with the pens on each beam, series of levers for actuating the lifting levers of both pen-beams in groups, a series of cams, one series of the actuating levers contacting directly with the cams, and transmitting levers interposed between the cams and the other series of actuating levers.

49. The combination with a pen-beam, of standards, a shaft extending between the standards, pen-controlling levers mounted on the shaft, and actuating levers for the controlling levers fulcrumed in the standards above the controlling-lever.

50. In a ruling machine, the combination with a pen-beam and its spindle, of a bearing for the spindle, a spring surrounding the spindle and engaging the bearing at one of its extremities, and means engaging the other extremity of the spring for varying its tension.

51. In a ruling machine, the combination with a pen-beam and its spindle, of a bearing for the spindle, a spring surrounding the spindle and engaging the bearing at one of its extremities, and means coöperating with the other extremity of the spring and with the spindle for varying the tension of said spring.

52. In a ruling machine, the combination with a pen-beam and its spindle, of a spring surrounding the spindle and being fixed at one extremity independently of the spindle, and members at the other extremity of the spring having coöperating projections, one of said members being provided with means for securing it to the spindle and the other member turning about the spindle and coöperating with the spring.

53. In a ruling machine, the combination with a pen-beam and its spindle, of a spring surrounding the spindle and being fixed at its inner end independently of the spindle, a nut threaded on the outer end of the spindle and having projections, and a handwheel engaging the outer extremity of the spring and being provided with projections for engagement with those of the nut.

54. In a ruling machine, the combination with a movable pen-beam, of means for uniformly resisting the movement of the beam, and means for varying the resistance of said resisting means.

55. In a ruling machine, the combination with a pen-beam and its spindle, of a bearing for the spindle, and a friction device mounted upon the bearing and engaging the spindle.

56. In a ruling machine, the combination with a pen-beam and its spindle, of a bearing for the spindle, and a friction device presenting a constant resistance to the movement of the spindle.

57. In a ruling machine, the combination with a pen-beam and its spindle, of a fixed divided collar surrounding the spindle, and a screw for drawing the collar into engagement with the spindle.

58. In a ruling machine, the combination with ruling devices, of a support therefor, means operating upon the support to raise and lower the ruling devices, such means in its operation tending to produce a lateral movement or stagger of the ruling devices, and means acting upon the support to prevent such stagger of the ruling devices.

59. In a ruling machine, the combination with a pen-beam and its spindles, of pens carried by the beam, means for raising and lowering the pens, such means in its operation tending to produce a lateral movement or stagger to the pens, and means for applying to the spindles frictional pressure sufficiently great to prevent such stagger of the pens.

60. In a ruling machine, a movable pen-beam provided with a contact portion, a latch coöperating with the contact portion, and a spring to normally maintain the latch out of the path of the contact portion.

61. The combination with a movable pen-beam, of a latch having a portion coöperating with the beam to prevent movement of the beam in one direction and another portion coöperating with the beam to prevent movement of the latch itself in another direction.

62. A movable pen-beam carrying a contact-screw a latch with which the end of the screw contacts, said latch having a projection coöperating with the side of the screw, and a spring tending to force the latch-projection against the screw when the end of said screw is in engagement with the latch.

63. The combination with a ruling device, of an endless carrier for delivering the material operated on to the ruling device, an endless retainer for the material coöperating with the carrier, a guide for the retainer and means for mounting the guide for adjustment across the carrier and material thereon out of contact with the lines ruled.

64. The combination with a ruling device, of an endless carrier for delivering the material operated on to the ruling device, a plurality of endless retainers for the material coöperating with the carrier, and independent guides for each retainer, and means for mounting the guides for separate adjustment transversely of the carrier.

65. The combination with a ruling device, of an endless carrier for delivering the material operated on to the ruling device, an endless retainer for the material coöperating with the carrier, supports for the retainer, and guides adjustable to vary the position of the retainer upon the supports.

66. In a ruling machine, a frame, an endless carrier movable longitudinally of the frame, ruling devices coöperating with the carrier, an endless retainer coöperating with the carrier, guides for the retainer situated near opposite extremities of the frame, and means for mounting the guides for adjustment across the carrier and material thereon out of contact with the lines ruled.

67. Ruling devices, a feed-belt traveling beneath the ruling devices, cords operating over the surface of the belt, and a separate roll contacting with each cord.

68. Ruling devices, a feed-belt traveling beneath the ruling devices, cords operating over the surface of the belt, a series of rolls contacting with adjacent cords, and means for mounting the rolls of the series for independent adjustment across the belt.

69. Ruling devices, a feed-belt traveling beneath the ruling devices, cords operating over the surface of the belt, a series of grooved rolls contacting with adjacent cords, and means for mounting the rolls of the series for adjustment across the belt.

70. Ruling devices, a feed-belt traveling beneath the ruling devices, cords operating over the surface of the belt, a bar extending across the belt, brackets mounted on the bar, and means for fixing the brackets in different positions upon the bar, said brackets each having a member coöperating with the cords.

71. Ruling devices, a feed-belt traveling beneath the ruling devices, cords operating over the surface of the belt, a bar extending across the belt, brackets mounted on the bar, means for fixing the brackets in different positions upon the bar, and rolls journaled in the brackets and contacting with the cords.

72. In a sheet-ruling machine, ruling devices, means for moving the sheets into coöperation with the ruling devices, and operator-controlled means for varying the angle of the sheets with respect to the ruling devices during their movement toward the ruling devices.

73. In a ruling machine, the combination with a pen-beam and its spindles, of a fixed divided collar surrounding the spindle, and a screw mounted to rotate freely in one portion of the collar and having threaded engagement with the other.

74. The combination with a beam, of a series of pens mounted therein, a plurality of lifting levers for the pens, a support about which the lifting levers move, and means connecting the levers and support and acting to retain said levers in their normal position.

75. The combination with a beam, of a series of pens mounted therein, a plurality of lifting levers for the pens, a support about which the lifting levers move, and a spring connecting the levers and support.

76. The combination with a beam, of a series of pens mounted therein, a plurality of lifting levers for the pens, a support about which the lifting levers move, springs connecting the levers and support, and means for securing the springs in different positions.

77. The combination with a beam, of a series of pens mounted therein, a plurality of lifting levers for the pens, a support about which the lifting levers move, and stops for the levers carried by the support.

78. The combination with a beam, of a series of pens mounted therein, a plurality of lifting levers for the pens, a support about which the lifting levers move, stops for the levers carried by the support, and means for varying the positions in which the levers are retained by the stops.

79. The combination with a beam, of a series of pens mounted therein, a plurality of lifting levers for the pens, said lifting levers being each provided with an opening, a support about which the lifting levers move and which has portions extending through the lever-openings, and means connecting the levers and support and acting to retain said levers in their normal position.

80. The combination with a beam, of a series of pens mounted therein, a plurality of lifting levers for the pens, said lifting levers being each provided with an opening, a support about which the lifting levers move and which has portions extending through the lever openings, and springs coöperating with said portions and with the levers.

81. The combination with a beam, of a series of pens mounted therein, a plurality of lifting levers for the pens, said lifting levers being each provided with an opening, a support about which the lifting levers move and which has portions extending through the lever openings, and means connecting the levers and support and acting to retain said levers in their normal position, said portions and levers having coöperating contact faces the relation of which may be altered to vary the range of movement of the levers.

82. In a ruling machine, ruling devices, means for delivering work to the ruling devices, and means variable during the operation of the machine for changing the position of the work upon the delivery means with respect to the ruling devices.

83. In a ruling machine, ruling devices, means for delivering work to the ruling devices, means for positioning the work upon the delivery means, and means independent of the positioning means for changing the position of the work upon the delivery means.

84. In a ruling machine, ruling devices, means for delivering work to the ruling devices, means for positioning the work upon the delivery means, and means between the positioning means and ruling devices for changing the position of the work upon the delivery means.

85. In a ruling machine, ruling devices, upper and lower means for delivering work to the ruling devices, and means for varying the pressure of the upper delivery means against the work, whereby the position of said work upon the lower delivery means may be altered.

86. In a ruling machine, pens, a belt and cords operating thereover to deliver work to the pens, and means for varying the pressure of the cords against the work whereby the position of said work upon the belt is altered.

87. The combination with devices for ruling lines upon sheets, of a carrier for delivering the sheets to the ruling devices, retaining means for the sheets operating over the carrier, and means whereby the position of the retaining means may be varied to clear the lines ruled.

88. The combination with devices for ruling lines upon sheets, of a carrier for delivering the sheets to the ruling devices, a plurality of retaining means for the sheets operating over the carrier, and means individual to each retaining means whereby its position with respect to the lines ruled may be varied.

Signed at Boston, in the county of Suffolk and State of Massachusetts, this 22nd day of August, 1914.

HARMON E. LINDBLADH.

Witnesses:
JAMES E. LYNCH,
JOHN B. HYNES.